United States Patent [19]

Seragnoli

[11] 4,086,744
[45] May 2, 1978

[54] DEVICE FOR PREPARING HINGE-LID PACKETS OF CIGARETTES FOR APPLICATION OF SEALING STRIPS AND THE LIKE

[75] Inventor: Enzo Seragnoli, Bologna, Italy

[73] Assignee: G. D. Societa per Azioni, Italy

[21] Appl. No.: 732,599

[22] Filed: Oct. 15, 1976

Related U.S. Application Data

[63] Continuation-in-part of Ser. No. 560,138, Mar. 20, 1975.

[30] Foreign Application Priority Data

Apr. 17, 1974 Italy .................................. 3362 A/74

[51] Int. Cl.² ............................................. B65B 61/00
[52] U.S. Cl. ....................................... 53/137; 198/416
[58] Field of Search .. 53/137; 198/411; 412; 415; 416

[56] References Cited

U.S. PATENT DOCUMENTS

| | | | |
|---|---|---|---|
| 1,179,383 | 4/1916 | Adderson | 198/416 X |
| 1,881,187 | 10/1932 | Hermani | 198/416 X |
| 2,293,498 | 8/1942 | First et al. | 198/416 X |
| 2,728,307 | 12/1955 | Rhodes | 198/416 X |
| 3,823,815 | 7/1974 | Britten | 198/415 X |

Primary Examiner—Othell M. Simpson
Assistant Examiner—John Sipos
Attorney, Agent, or Firm—Robert E. Burns; Emmanuel J. Lobato; Bruce L. Adams

[57] ABSTRACT

A device for re-orienting and redistributing hinge-lid packets of cigarettes for application of sealing strips or revenue stamps to the hinge-lids. A first conveyor unit receives the packets, disposed on edge and contacting one another with their wide sides, and having their hinge-lid portions facing away from one side of the conveyor unit. The first conveyor unit moves the packets gradually to a second conveyor unit. This unit moves more rapidly than the first, to space the packets apart. It cooperates with a deflector disk and a narrow overhead belt to turn each packet so that it travels to the delivery end of the second conveyor unit, with the hinge-lid portion facing forward, toward a machine for applying a seal strip or the like.

2 Claims, 13 Drawing Figures

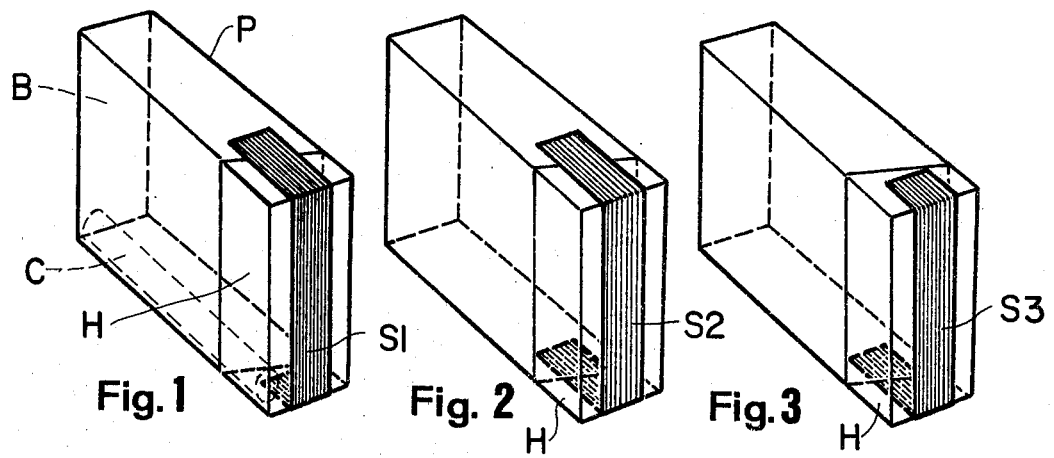
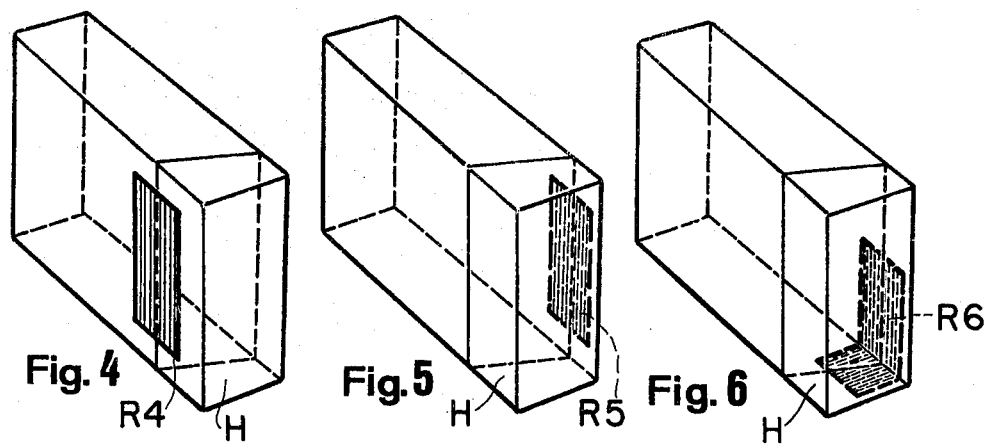
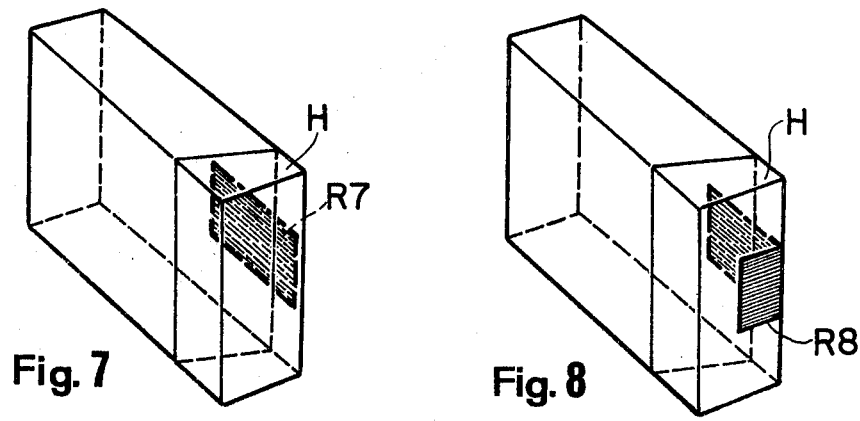

DEVICE FOR PREPARING HINGE-LID PACKETS OF CIGARETTES FOR APPLICATION OF SEALING STRIPS AND THE LIKE

CROSS-REFERENCE TO EARLIER APPLICATION

This is a Continuation-in-Part of the applicant's earlier application, Ser. No. 560,138, filed Mar. 20, 1975.

BACKGROUND OF THE INVENTION

This invention relates to the field of machines for packeting cigarettes in packets of the hinge-lid type and, in particular, has as its subject a device for varying the arrangement of packets passing through the channel placed at the exit on one of the machines, in such a way as to prepare them for the future processing operations, such as, for example, the attaching of the State revenue stamp or of the sealing strip.

According to the known art, because of their particular shape and the materials used, hinge-lid packets have to necessarily be subjected, once they have been completed on the above-mentioned packeting machines, to a drying process in respect of their glued parts.

This drying process which, compared with the time taken to perform the various folding and wrapping operations, lasts a relatively long time, commences in a device in which the finished packets are accumulated. This device belongs to the packeting machine itself. It can be in the form of a column in which the packets are stacked or in the form of an intermittently rotatable cylinder or wheel, provided with radial, peripheral pockets in which the packets are housed, placed on edge with respect to the bases of the cylinder.

In both cases, the non fully dried glued parts on each packet are, during this stage, locked rigidly in position either by the contiguous packets (in the case of a stacking column) or by rigid walls (in the case of a cylinder), in such a way as to prevent any possibility of their coming apart.

Since, however, it has been seen that the time the packets stay in the storage device is insufficient for the glued parts to be dried thoroughly, the drying operation is concluded outside the hinge lid cigarette packeting machine. It is concluded particularly on the initial section of the channel, located immediately after this machine, used for supplying the basically finished packets, via an intermittently moving conveyor belt, to means which effect the further processing operations and, first of all, the attaching to the individual packets of the sealing strip and/or State revenue Stamp.

At this initial section of the channel, the packets arrive placed on edge on the conveyor belt, moving along transversely with respect to their longitudinal axis, side by side and tightly up against one another so as to continue to be rigidly locked in position.

This particular arrangement of the packets makes it possible, furthermore, for the length of the section of the channel needed to complete the drying process to be limited considerably, yet for the time the packets remain therein to be longer than would be the case if an alternative method were to be adopted, and to follow the rhythm at which the packets are passed onto the devices operating further along the line.

So far as all this has been considered up to this point, it appears quite satisfactory. However, the requirements for attaching sealing strips or State revenue stamps or the like must also be considered. They make is necessary for the strip or seal applicator to have easy, adequate access to the area surrounding the hinge-lid of each individual packet. For this purpose, in turn, the packets must be spaced apart, and must be oriented so as to present the hinge-lid in forward orientation. They must still rest on edge, with the cigarettes lying horizontally.

The present invention has the object to achieve this spacing apart and reorienting of the horizontally disposed hinge-lid packets. It has the further object to achieve this by a device that is simple and economical.

SUMMARY OF THE INVENTION

The new construction provides a device for reorienting or turning horizontally disposed, edge-supported hinge-lid packets for cigarettes and the like, so that they travel between the outlet of a packeting machine and the inlet of a strip or seal applying machine. The cigarette-filled hinge-lid packets are received on a first conveyor unit or conveyor and are transversely positioned thereon in mutual contact, side by side and on an edge. According to the invention, the packets are transferred from the first conveyor unit, onto a second and faster conveyor unit or conveyor, which spaces the packets from one another. A reorienting or turning device is provided, which comprises a narrow belt positioned above the receiving end portion of the second conveyor and parallel thereto, operating at the same speed and placed at a level such as to engage with a top edge of each packet. A disk is movable around a vertical shaft and is disposed to exert a deflecting action on the end of each travelling packet which is remote from the hinge-lid, whereby the packet is progressively rotated 90° on its base side, around a vertical axis serving as a movable pivot and passing through the contact area between the packets, the narrow belt, and the rapid conveyor belt.

BRIEF DESCRIPTION OF THE DRAWINGS

In the drawings, FIGS. 1 to 8 show, in perspective views, eight examples of hinge-lid packets complete with a sealing strip of the State revenue stamp;

DESCRIPTION OF THE PREFERRED EMBODIMENT

As shown in FIGS. 1 to 8, sealing strips S1 or S2 or S3 or revenue stamps R4 etc. or R8 are applied to seal the hinge-lid portions H of packets P, filled with cigarettes C or the like. The new machine serves to facilitate the application of these sealing strips or stamps, as already indicated above.

The sealing strips S-1 etc. and revenue stamps R1 etc. applied to different hinge-lids H for different markets, are quite different, as shown. Various examples of the application of the sealing strip are depicted in FIGS. 1, 2 and 3, and of the State revenue stamp in FIGS. 4, 5, 6, 7 and 8. These are typical for the requirements of the major markets. All of them are most conveniently applied by successively feeding mutually spaced packets, containing cigarettes and disposed so as to lie horizontally, with the hinge-lid forward, to the strip or seal applying machine.

Figure 9:
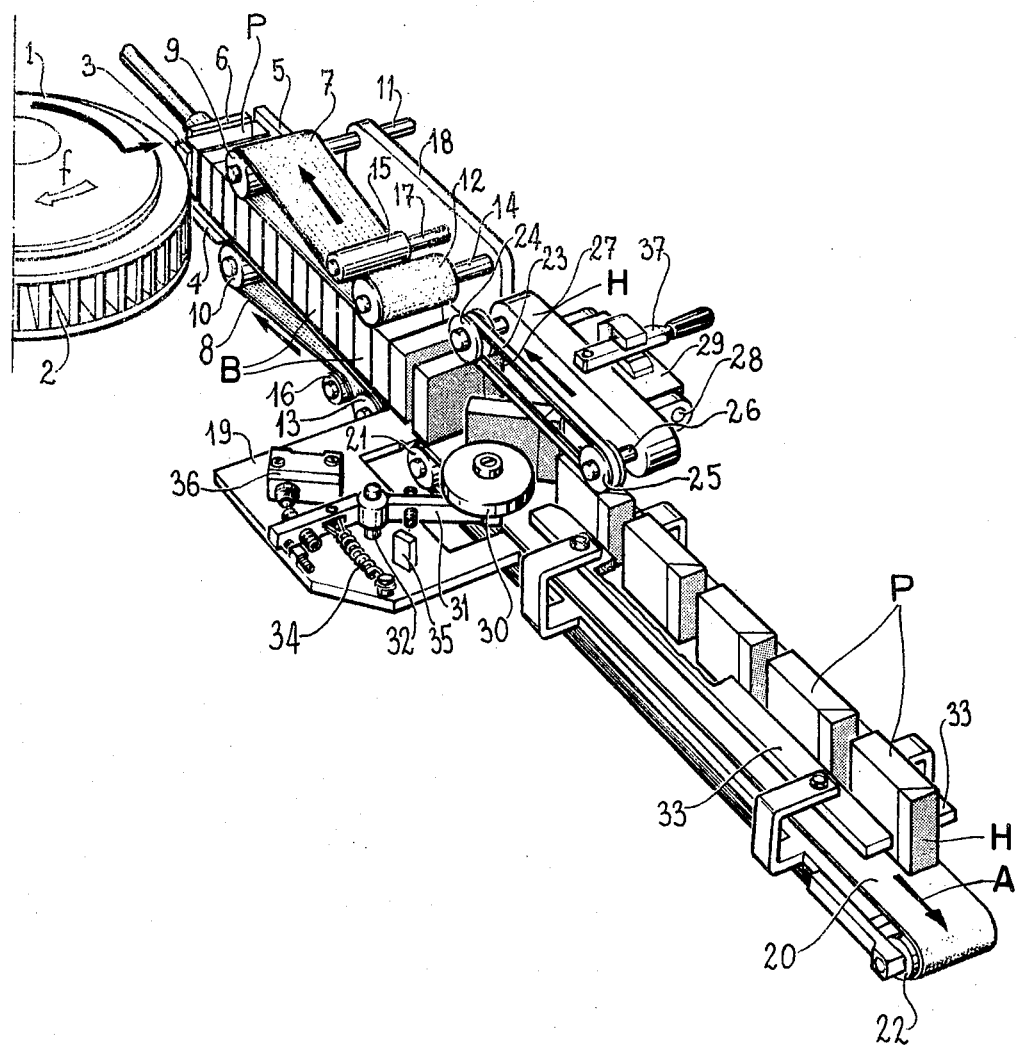
FIG. 9 shows schematically, in a perspective view, the device according to the invention.

However, as shown in FIG. 9, the filled packets are delivered in a different condition. The packeting machine typically comprises a wheel 1 mounted on a vertical shaft, provided with peripheric, radial pockets 2, and suitably given an intermittent rotation movement in a clockwise direction around the shaft (arrow f).

The wheel 1 is a part of a machine for packeting cigarettes in packets P of the hinge-lid type, which packets are box-shaped, having a pair of wide sides, a pair of long narrow sides, and a pair of short narrow sides or ends, one of which incorporates a hinge-lide H (FIG. 1). At a station not depicted in the present drawings the wheel 1 receives in its pockets 2, the finished packets P, lying on edge, that is to say, resting on one of their two long narrow sides, with the cigarettes lying horizontally and with the hinge lid H facing the periphery of the wheel.

On completion of a series of forward moves punctuated with stops, in the course of which glued parts of the packets are gradually dried, each packet P comes to a halt at an ejection station of the wheel 1. Here a pusher 3 operates, reciprocating radially. It engages with the base end B of each packet P, causing the packet to slide along its longitudinal axis from its pocket 2 on to a fixed plate 4 and up against a stop 5.

One of the wide sides of the last packet P, in a row of packets previously ejected from the wheel 1, is then engaged from the rear (looking at FIG. 9) by a second pusher 6, which reciprocates in a direction perpendicular to that of the ejecting pusher member 3. As the second pusher 6 moves forward, the packet P under consideration and, together with this, the whole row of packets supported on the plate 4, are pushed transversely of their major dimension, along an exiting channel tangential to the wheel 1, far enough to allow, in the next cycle, a fresh packet ejected by the pusher member 3 to be inserted.

The exiting channel, past the fixed plate 4, is delimitated at the top and bottom by two horizontal, parallel conveyor belts 7 and 8 between which the packets driven forward by the pusher member 6 are gradually inserted. The conveyor belts 7 and 8 are correspondingly moved continuously by pulleys 9 and 10, respectively. These pulleys are located immediately after the fixed plate 4, and are mounted on shafts 11, which are driven by means not shown in FIG. 9, while at the other end the belts turn over rollers 12 and 13, mounted on shafts 14. At 15 and 16 there are two intermediate rollers mounted on shafts 17, for tightening or adjusting belts 7 and 8, as is well known. The shafts 11, 14 and 17 are all carried by a fixed plate 18.

The packets P immediately downstream of rollers 12 and 13, are pushed constantly forward by the forward moving row of packets and are driven thereby onto a fixed plate 19 and, past this plate, onto a horizontal conveyor belt 20 travelling in the same direction as the belt 7 but at a faster speed, in such a way as to space the packets P in the row from one another. For this purpose, the end of the fast conveyor belt 20 nearest to the fixed plate 19 turns around a roller 21, while its other end turns around a roller 22.

Above the initial section of the fast conveyor belt 20, parallel to this belt, and travelling at the same speed, a belt 23, narrower than the conveyor belt 20, moves so that its lower rim engages an end portion of the upper narrow side of each packet P arriving on the conveyor belt 20, this engaged end being disposed at or near the hinge-lid H. The belt 23 turns around pulleys 24 and 25, one of which is driven, by means not shown. These pulleys are mounted on horizontal shafts 26 extending from a block 27 connected to a fixed support 29 via a horizontal pivot 28.

Figure 9A:
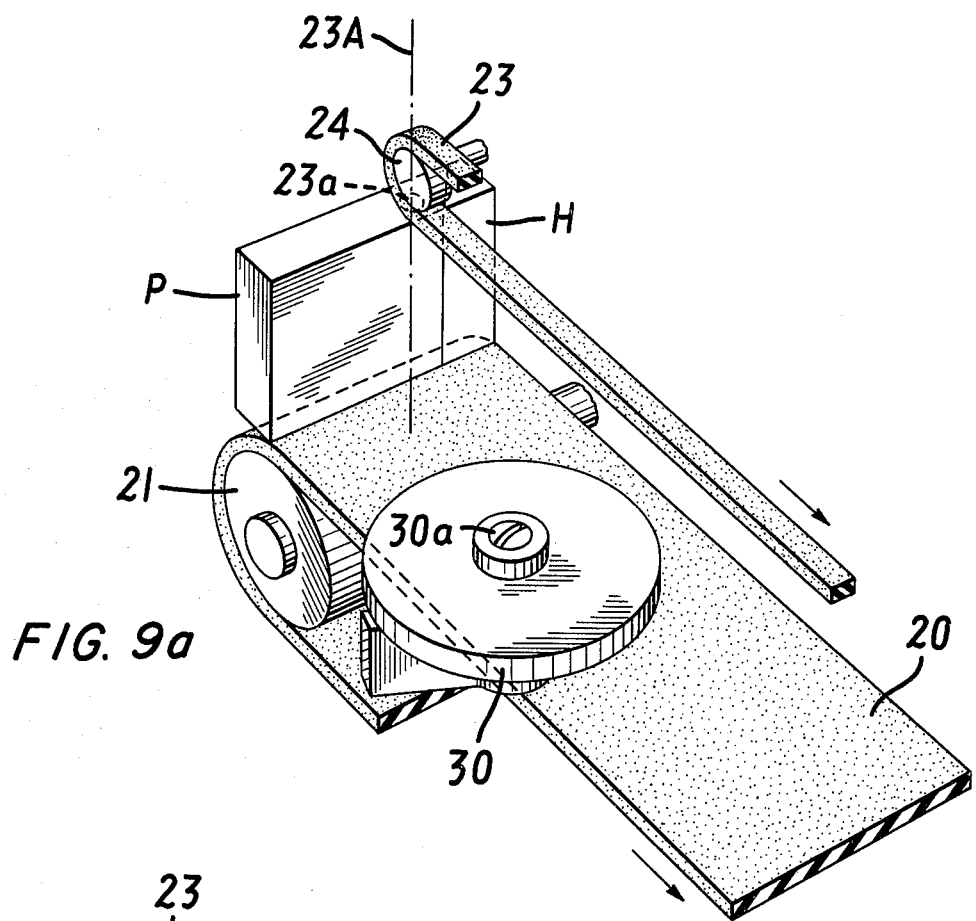
FIGS. 9a to 9d similarly show a detail of this device, in four operating positions thereof.

The engaging of each packet, by narrow belt 23, is illustrated in FIG. 9a. It is provided so as to provide a narrow belt-contact area 23a on and travelling with packet P and narrow belt 23, thereby providing in this area 23a a vertical pivot 23A, similarly travelling for turning the packet about the pivot.

Figure 9B:
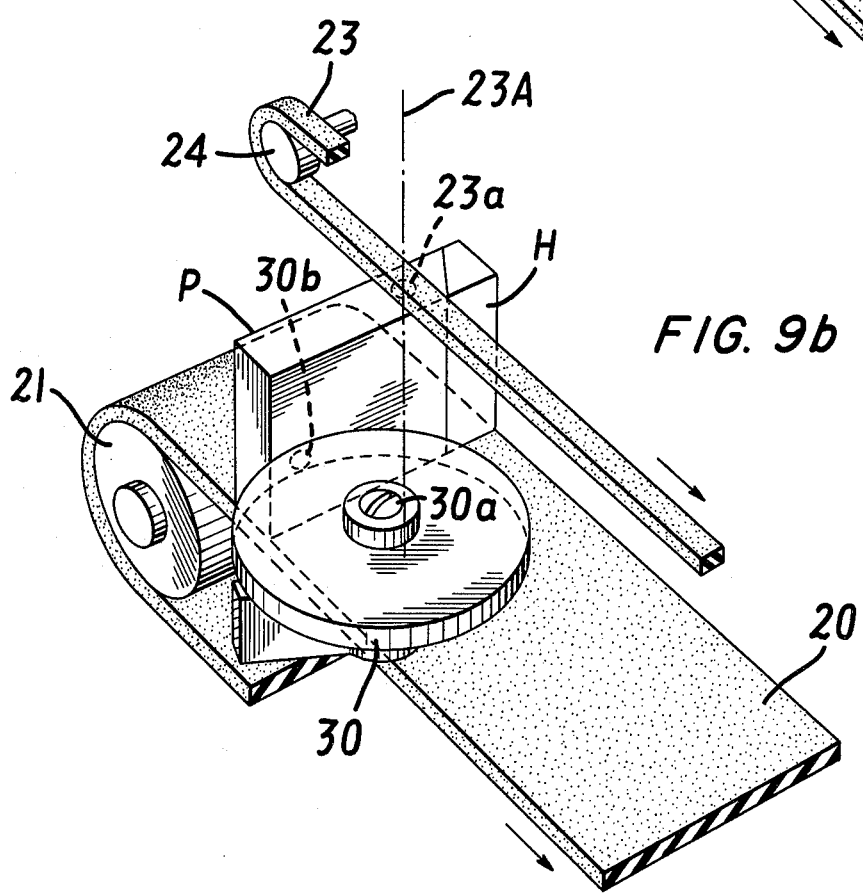

As shown in FIG. 9b, the vertical front sides of the packets P — which packets move forward between the belts 20 and 23 and are spaced apart by the faster motion of these belts — come into contact with the edge of a deflector disk 30 idling on a vertical shaft 30a. The shaft is mounted on one arm of a two-armed lever 31 anchored to a vertical pivot 32 on the plate 19. This plate extends from the conveyor belt channel in the form of a bracket. As illustrated, the disk contacts end portions 30b, 30b', 30b'' of these front sides adjacent the base ends B of the packets, thereby applying a deflecting action to the travelling packets.

Figure 9C:
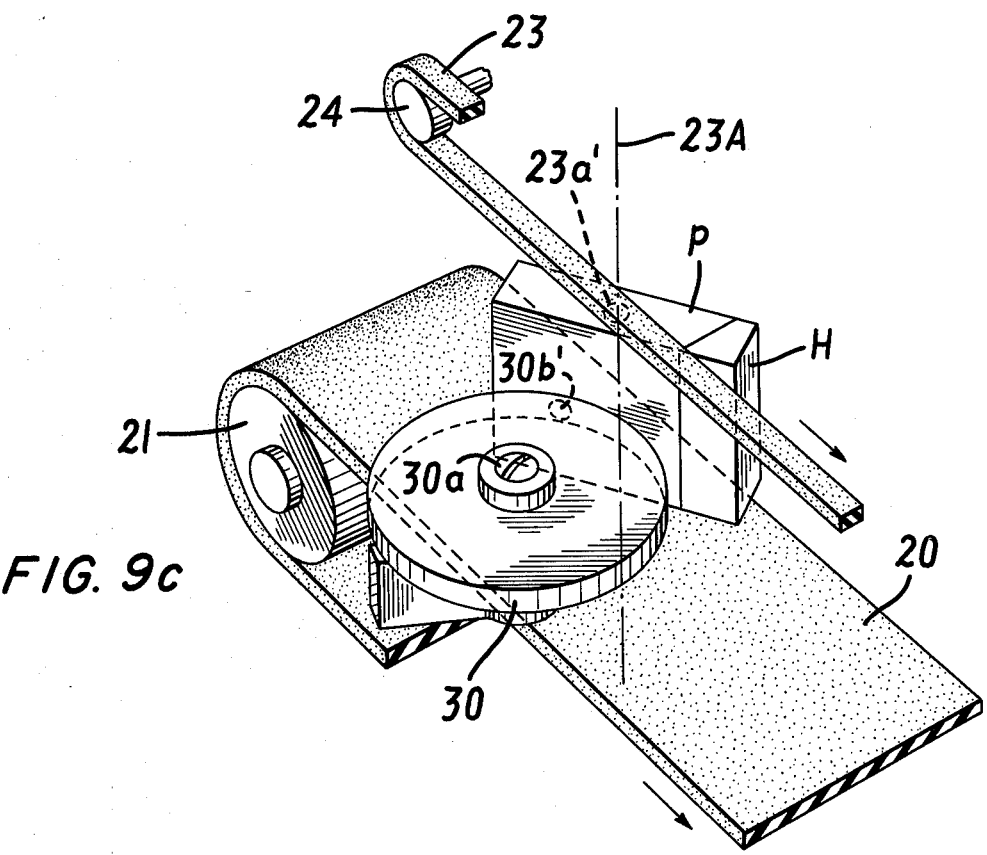
Figure 9D:
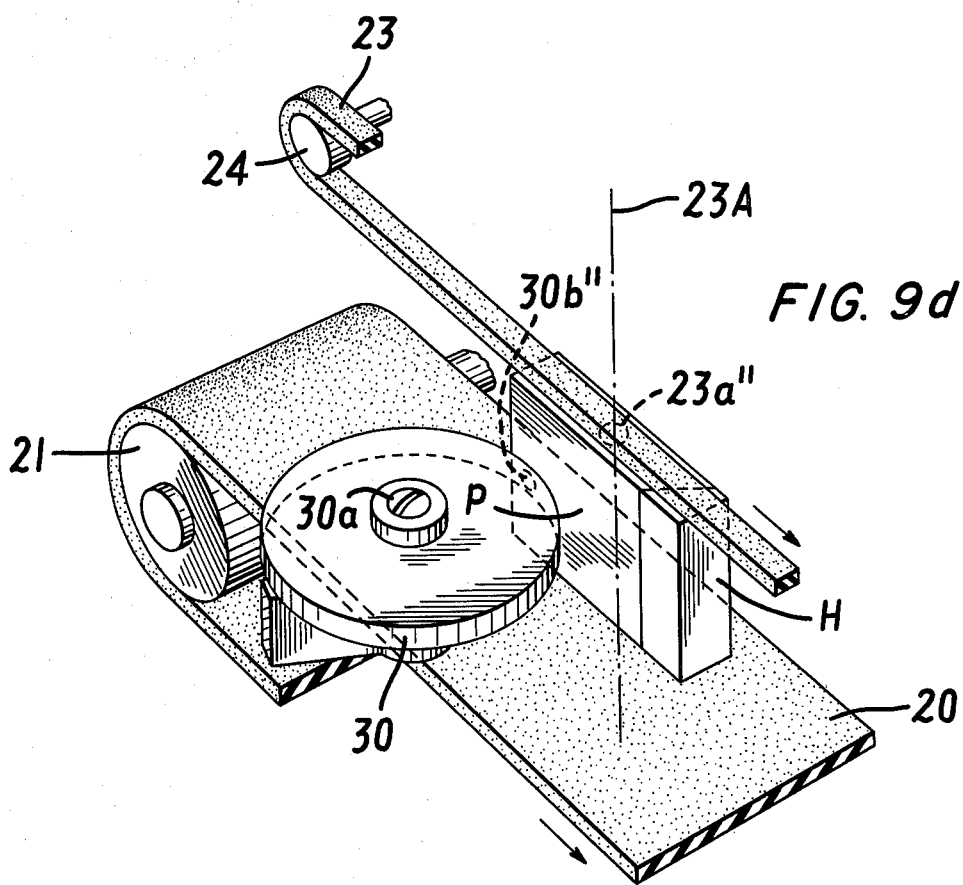

By this action, as shown in FIG. 9c, disk 30 causes each packet P to rotate gradually, clockwise around pivot 23A. Finally, as shown in FIG. 9d, adjacent the forward, final extremity of the narrow overhead belt 23, the spaced-apart packets travelling on the rapid conveyor belt 20, now rotated at an angle of 90° compared with their previous position and moving along on edge in the direction of their horizontal longitudinal axes arrive forwardly, that is, at the exit, of the turning unit 23, 30. Here, as shown in FIG. 9, they are released by this unit, and go in between two horizontal, fixed guides 33 disposed parallel with the conveyor belt 20. These guides extend up to the far end portion of the belt 20, where the packets travel, in longitudinal direction A, to a station where means are provided (not shown herein) for affixing the sealing strips or the State revenue stamps. For this purpose each successive packet P is delivered horizontally spaced from the preceding and following packets, and so as to present the hinge-lid end H of the packet in forward direction, as shown.

The initial engaging of packet P by narrow belt 23 occurs upstream of deflector disk 30. The releasing of the packets occurs downstream of this disk.

In further accordance with the invention, means are provided in the area where the turning disk 30 operates, for halting the infeed of packets, should blockages or bottlenecks occur while the packets are being rotated.

When such a blockage occurs, sufficient pressure is exerted on disk 30 to overcome the resistance of a spring 34 fitted on the second arm of the two-armed lever 31 and fastened at its other end to the previously mentioned plate 19 by means of a pin.

The two-armed lever 31 supporting the said disk 30 then undergoes a rotation around its vertical pivot 32 as far as a stop 35, so that through the extremity of its second arm, a microswitch 36 for halting the infeed is tripped.

The block 27, which, through the shafts 26, carries the pulleys 24 and 25 and the belt 23 can easily be raised by manually moving a lever 37. This is to allow ready access to the packet-deflecting area between the disk 30 and the packets P, so that normal operating conditions can be resumed.

What is claimed is:

1. A device for preparing hinge-lid cigarette packets for sealing, comprising a first conveyor belt for packets filled with cigarettes, each packet having a pair of wide sides, a pair of long narrow sides, and a pair of short narrow end portions, one of which comprises a hinge-lid, the conveyor belt being disposed to receive each packet, positioned transversely of the conveyor belt in an initial side-by-side contact relationship wherein the received packet rests on one of its long narrow sides with the wide side of the packet contacting wide sides of preceding and following packets and the conveyor belt being driven to advance at a corresponding speed, a second conveyor belt driven to advance at a higher speed than the first conveyor belt for modifying the initial relationship of the packets for spacing the packets from one another on said second conveyor belt, and to advance the so-spaced packets to a station for applying strip-like material to the hinge-lids, and turning means disposed in an upstream portion of said second conveyor belt, said turning means comprising;

a narrow driving belt positioned parallel to and spaced above a portion of the second conveyor belt and normally contacting portions of the long narrow sides of the packets adjacent the ends thereof comprising the hinge-lids;

a deflector unit positioned above a portion of the second conveyor belt which portion normally underlies portions of the long sides of the packets remote from the hinge-lids, for deflecting the spaced packets from their being positioned transversely of the second conveyor belt; and means for moving the narrow driving belt in the same direction and at the same speed as the second conveyor belt, so that a portion of an upper long narrow side of each packet, adjacent the hinge-lid, is engaged by the narrow driving belt, upstream of the deflector unit to provide a narrow belt-contact area on and travelling with the packet and narrow driving belt past the deflector unit, and thereby to provide in said area a pivot, similarly travelling for turning the packet about the pivot upon said deflecting, into a position longitudinal of the second conveyor belt and with the hinge-lid facing forward.

2. A device according to claim 1, wherein said deflector unit comprises a rotatable disk parallel to the second conveyor belt.

* * * * *